United States Patent
Joko (10) Patent No.: US 9,819,194 B2
(45) Date of Patent: Nov. 14, 2017

(54) POWER MANAGEMENT SYSTEM, POWER MANAGEMENT METHOD, AND UPPER POWER MANAGEMENT APPARATUS

(75) Inventor: Shingo Joko, Kawasaki (JP)

(73) Assignee: KYOCERA CORPORATION, Kyoto (JP)

(*) Notice: Subject to any disclaimer, the term of this patent is extended or adjusted under 35 U.S.C. 154(b) by 527 days.

(21) Appl. No.: 14/346,958

(22) PCT Filed: Sep. 4, 2012

(86) PCT No.: PCT/JP2012/072509
§ 371 (c)(1),
(2), (4) Date: Mar. 24, 2014

(87) PCT Pub. No.: WO2013/047116
PCT Pub. Date: Apr. 4, 2013

(65) Prior Publication Data
US 2014/0244060 A1 Aug. 28, 2014

(30) Foreign Application Priority Data
Sep. 26, 2011 (JP) ................................. 2011-209955

(51) Int. Cl.
*H02J 4/00* (2006.01)
*H02J 3/14* (2006.01)
*H02J 13/00* (2006.01)

(52) U.S. Cl.
CPC .................... *H02J 4/00* (2013.01); *H02J 3/14* (2013.01); *H02J 13/002* (2013.01);
(Continued)

(58) Field of Classification Search
CPC ... H02J 4/00; H02J 13/002; H02J 3/14; Y04S 20/224; Y04S 20/222; Y02B 70/3225
(Continued)

(56) References Cited

U.S. PATENT DOCUMENTS 4,216,384 A * 8/1980 Hurley ...................... H02J 3/14
307/35
2008/0167756 A1* 7/2008 Golden .................. G05B 15/02
700/297
(Continued)

FOREIGN PATENT DOCUMENTS

EP 2296112 A2 3/2011
JP 10-334385 A 12/1998
(Continued)

OTHER PUBLICATIONS

Extended European Search Report dated Jun. 15, 2015 issued by the European Patent Office for Counterpart European Application No. EP 12837078.0.
(Continued)

*Primary Examiner* — Jason Lin
(74) *Attorney, Agent, or Firm* — Procopio Cory Hargreaves and Savitch LLP (57) ABSTRACT

A power management system comprises a plurality of HEMSs 10 and a CEMS 40. The CEMS 40 receives from each HEMS 10, power information including an amount of power consumed by a load connected to each HEMS 10. The CEMS 40 transmits, to each HEMS 10, reduction information including an amount of power that should be reduced in each consumer 70 in response to a power curtailment signal and the power information.

10 Claims, 3 Drawing Sheets

(52) U.S. Cl.
CPC .......... *Y02B 70/3225* (2013.01); *Y04S 20/222* (2013.01); *Y04S 20/224* (2013.01)

(58) Field of Classification Search
USPC .......................................................... 700/295
See application file for complete search history.

(56) References Cited

U.S. PATENT DOCUMENTS

| | | | | |
|---|---|---|---|---|
| 2008/0172312 | A1* | 7/2008 | Synesiou | G06Q 10/00 705/34 |
| 2009/0307178 | A1* | 12/2009 | Kuhns | G06Q 10/06 706/54 |
| 2010/0141046 | A1* | 6/2010 | Paik | H02J 3/14 307/126 |
| 2010/0145884 | A1 | 6/2010 | Paik | |
| 2011/0025519 | A1* | 2/2011 | Donaldson | H04L 67/125 340/664 |
| 2011/0153108 | A1 | 6/2011 | Yoon et al. | |
| 2011/0202467 | A1* | 8/2011 | Hilber | G06Q 50/188 705/80 |

FOREIGN PATENT DOCUMENTS

| | | |
|---|---|---|
| JP | 2000-270379 A | 9/2000 |
| JP | 2003-134695 A | 5/2003 |
| JP | 2003-348771 A | 12/2003 |
| JP | 2004-180411 A | 6/2004 |
| JP | 2010-075015 A | 4/2010 |
| JP | 2010-128810 A | 6/2010 |
| JP | 2011-188620 A | 9/2011 |
| WO | 2010/065197 A2 | 6/2010 |
| WO | 2011-027195 A1 | 3/2011 |
| WO | 2011-098873 A2 | 8/2011 |

OTHER PUBLICATIONS

International Search Report; PCT/JP2012/072509; Nov. 13, 2012.

T.Maegawa, "Development of Community Energy Management System", IEICE Technical Report, Jul. 14, 2011, vol. 111, No. 146, pp. 99-104.

* cited by examiner

POWER MANAGEMENT SYSTEM, POWER MANAGEMENT METHOD, AND UPPER POWER MANAGEMENT APPARATUS

TECHNICAL FIELD

The present invention relates to a power management system, a power management method, and an upper power management apparatus that reduce power consumed by a load provided in a plurality of consumers.

BACKGROUND ART

In recent years, it is known a technology of controlling, by a power management apparatus (for example, HEMS: Home Energy Management System) provided in each consumer, a load provided in a consumer and a dispersed power source provided in a consumer, for example.

Examples of the dispersed power source may include a power generation equipment that utilizes clean energy such as sunlight, wind power, and geothermal energy. Alternatively, examples of the dispersed power source may also include a fuel cell such as SOFC (Solid Oxide Fuel Cell).

In such a system, when it is expected that an amount of power to be supplied from a power grid is smaller than a total amount of power consumed in a consumer connected to the power grid, a power company that manages the power grid transmits, to each power management apparatus, a power curtailment signal (DR: Demand Response) instructing restraint of an amount of power consumed, and each power management apparatus reduces power consumed by a load in response to the power curtailment signal (for example, Patent Literature 1). The power curtailment signal is a signal indicating an amount of power that should be reduced by each consumer (for example, a ratio of power to be reduced relative to power currently consumed, or an absolute value of power to be reduced relative to power currently consumed).

CITATION LIST

Patent Literature

Patent Literature 1: Japanese Patent Application Publication 2010-128810

SUMMARY OF THE INVENTION

In this case, from a viewpoint of a power company, it may suffice that the total amount of power consumed is reduced irrespective of an amount of power reduced by each consumer connected to the power grid. However, there is a need of considering situations of a plurality of consumers (power management apparatus).

Therefore, the present invention has been achieved in order to solve the above-described problem, and an object thereof is to provide a power management system, a power management method, and an upper power management apparatus with which it is possible to appropriately restrain an amount of power consumed by a load provided in each consumer.

A power management system according to the first feature comprises a plurality of lower power management apparatuses each of which is provided for each of a plurality of consumers and an upper power management apparatus that manages the plurality of lower power management apparatuses. Each lower power management apparatus transmits, to the upper power management apparatus, power information including an amount of power consumed by a load connected to each lower power management apparatus. The upper power management apparatus transmits, to each lower power management apparatus, reduction information including an amount of power that should be reduced in each consumer in response to a power curtailment signal transmitted from a power company that manages a power grid and the power information.

In the first feature, each lower power management apparatus transmits, to the upper power management apparatus, the power information including an amount of power consumed for each category to which the load connected to each lower power management apparatus belongs.

In the first feature, the category has a priority. The upper power management apparatus decides an amount of power that should be reduced in each consumer so as to preferentially reduce power consumed by a load belonging to a category having a low priority.

In the first feature, each lower power management apparatus reduces power consumed by a load connected to each lower power management apparatus, in response to the reduction information received from the upper power management apparatus.

In the first feature, the power curtailment signal includes an amount of power that should be reduced from an amount of power currently consumed by a load connected to the power grid.

In the first feature, the upper power management apparatus decides an amount of power that should be reduced in each consumer, in accordance with a coefficient corresponding to a contract of a maximum current value available for each consumer.

In the first feature, each lower power management apparatus periodically transmits, to the upper power management apparatus, the power information including an amount of power consumed for each category to which the load connected to each lower power management apparatus belongs.

A power management method according to the second feature is applied to a power management system comprising a plurality of lower power management apparatuses each of which is provided for each of a plurality of consumers and an upper power management apparatus that manages the plurality of lower power management apparatuses. The power management method comprises: a step of transmitting, from each lower power management apparatus to the upper power management apparatus, power information including an amount of power consumed by a load connected to each lower power management apparatus; and a step of transmitting, from the upper power management apparatus to each lower power management apparatus, reduction information including an amount of power that should be reduced in each consumer, in response to a power curtailment signal transmitted from a power company that manages a power grid and the power information.

In the second feature, in the step of transmitting the power information, the power information including an amount of power consumed for each category to which the load connected to each lower power management apparatus belongs is transmitted from each lower power management apparatus to the upper power management apparatus.

In the second feature, the power management method further comprises a step of reducing, in each lower power management apparatus, power consumed by a load connected to each lower power management apparatus, in response to reduction information received from the upper power management apparatus.

In the second feature, the power curtailment signal includes an amount of power that should be reduced from an amount of power currently consumed by a load connected to the power grid.

An upper power management apparatus according to the third feature manages a plurality of lower power management apparatuses each of which is provided for each of a plurality of consumers. The upper power management apparatus comprises: a reception unit that receives power information including an amount of power consumed by a load connected to each lower power management apparatus, from each lower power management apparatus; and a transmission unit that transmits, to each lower power management apparatus, reduction information including the amount of power that should be reduced in each consumer, in response to a power curtailment signal transmitted from a power company that manages a power grid and the power information.

In the third feature, the reception unit receives the power information including an amount of power consumed for each category to which the load connected to each lower power management apparatus belongs, from each lower power management apparatus.

In the third feature, the power curtailment signal includes an amount of power that should be reduced from an amount of power currently consumed by a load connected to the power grid.

The present invention can provide a power management system, a power management method, and an upper power management apparatus with which it is possible to appropriately restrain an amount of power consumed by a load provided in each consumer.

DESCRIPTION OF THE EMBODIMENT

Hereinafter, the power management system according to the embodiment of the present invention will be described. Note that the same or similar reference signs are applied to the same or similar portions in the following descriptions of the drawings.

It must be understood that the drawings are schematic, and the ratio of each dimension and the like may differ from the real one. Accordingly, specific dimensions and the like should be understood with reference to the following description. Furthermore, it must be understood that, the relationship or ratio of dimensions included in each of the drawings may differ.

SUMMARY OF THE EMBODIMENT

A power management system according to the embodiment comprises a plurality of lower power management apparatuses each of which is provided for each of a plurality of consumers and an upper power management apparatus that manages the plurality of lower power management apparatuses. Each lower power management apparatus transmits, to the upper power management apparatus, power information including an amount of power consumed by a load connected to each lower power management apparatus. The upper power management apparatus transmits, to each lower power management apparatus, reduction information including an amount of power that should be reduced in each consumer in response to a power curtailment signal transmitted from a power company that manages a power grid and the power information.

Thus, when the upper power management apparatus that manages the plurality of lower power management apparatuses instructs each of the lower power management apparatuses to reduce power, it is possible to appropriately restrain the amount of power consumed by a load provided in each consumer.

(Configuration of Power Management System)

Figure 1:
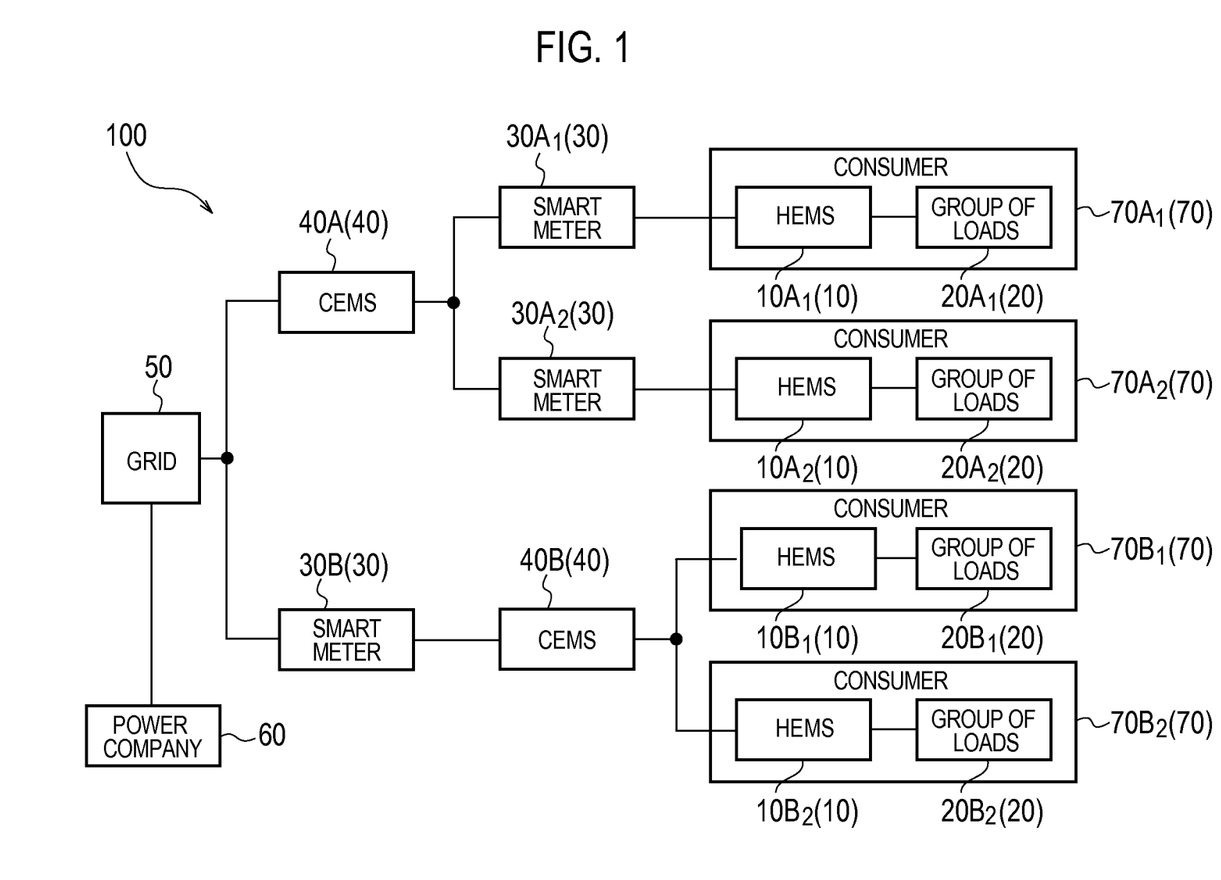
FIG. 1 is a diagram showing a power management system 100 according to the first embodiment.

Hereinafter, a power management system according to a first embodiment will be described. FIG. 1 is a diagram showing a power management system 100 according to the first embodiment.

As shown in FIG. 1, the power management system 100 includes an HEMS 10, a group of loads 20, a smart meter 30, a CEMS 40, a grid 50, and a power company 60. The HEMS 10 and the group of loads 20 are provided within a consumer 70.

The HEMS 10 is an apparatus (HEMS: Home Energy Management System) that manages power of the consumer 70. In the first embodiment, the HEMS 10 includes a function of controlling the group of loads 20 by using a protocol such as ECHONET Lite or ZigBee. For example, the HEMS 10 is capable of controlling the power consumed by the group of loads 20 by controlling an operation mode of the group of loads 20.

In the first embodiment, as the HEMS 10, an HEMS $10A_1$, an HEMS $10A_2$, an HEMS $10B_1$, and an HEMS $10B_2$ are provided. Further, the HEMS 10 is an example of a lower power management apparatus. The HEMS 10 will be described in detail later (see FIG. 2).

The group of loads 20 is a group of equipment by which power is consumed. Examples of the group of loads 20 include equipment such as a refrigerator, lighting, an air conditioner, and TV. Further, a dispersed power source such as a storage battery, a photovoltaic power generation equipment (PV), and a fuel cell (SOFC) may be provided within the consumer 70.

In this case, it is possible to classify a load included in the group of loads 20 (that is, a load connected to the HEMS 10) into a plurality of categories. Further, each category has a priority.

For example, the load is classified into three categories (categories A to C). The category A is a category to which a load (for example, a refrigerator), for example, indispensable in a daily life, belongs. The category B is a load (for example, lighting and an air conditioner) directly related to a daily life, other than loads belonging to the category A. The category C is a load (for example, TV) not belonging to the category A nor the category B. In this case, the category A has the highest priority, and the category C has the lowest priority.

The category is basically set previously to each load; however, the category is preferably changeable by a user. For example, even when a category of a certain load is set as the category C at the time of product shipment, it is preferable that the category be changeable to another category depending on each usage manner of a user. The HEMS 10 stores information notifying the category to which the load belongs, periodically received from each load included in the group of loads 20, for example. Alternatively, when a category of a load included in the group of loads 20 is changed (for example, when a new load is added to the group of loads 20, or when the category of the load is changed), the HEMS 10 receives the information for notifying the change in category from the load and stores the information.

In the first embodiment, as the group of loads 20, a group of loads $20A_1$, a group of loads $20A_2$, a group of loads $20B_1$, and a group of loads $20B_2$ are provided. The HEMS $10A_1$ and the group of loads $20A_1$ are provided within a consumer $70A_1$, and the HEMS $10A_2$ and the group of loads $20A_2$ are provided within a consumer $70A_2$. Likewise, the HEMS $10B_1$ and the group of loads $20B_1$ are provided within a consumer $70B_1$, and the HEMS $10B_2$ and the group of loads $20B_2$ are provided within a consumer $70B_2$.

Basically, the smart meter 30 is a meter that measures power consumed by the group of loads 20. In the first embodiment, the smart meter 30 includes a communication function, and is capable of receiving information from the HEMS 10, the CEMS 40, and the grid 50 (power company 60).

In the first embodiment, as the smart meter 30, a smart meter $30A_1$, a smart meter $30A_2$, and a smart meter 30B are provided. As shown in FIG. 1, the smart meter 30 may be provided closer to the grid 50 than the CEMS 40, or may be provided closer to the consumer 70 than the CEMS 40.

The CEMS 40 is an apparatus (CEMS: Community Energy Management System) that manages a plurality of HEMSs 10. The CEMS 40 collects information from each HEMS 10 and provides instruction for an operation to each HEMS 10.

In the first embodiment, as the CEMS 40, a CEMS 40A and a CEMS 40B are provided. Further, the CEMS 40 is an example of an upper power management apparatus. The CEMS 40 will be described in detail later (see FIG. 3).

The grid 50 is a power line for supplying each consumer 70 with power supplied from a power station, etc. The power company 60 is a business operator managing the grid 50.

The consumer 70 is a unit managed by one HEMS 10. For example, the consumer 70 may be a single house or a housing complex such as an apartment house. Alternatively, the consumer 70 may be a dwelling unit configuring a housing complex.

(Lower Power Management Apparatus)

Figure 2:
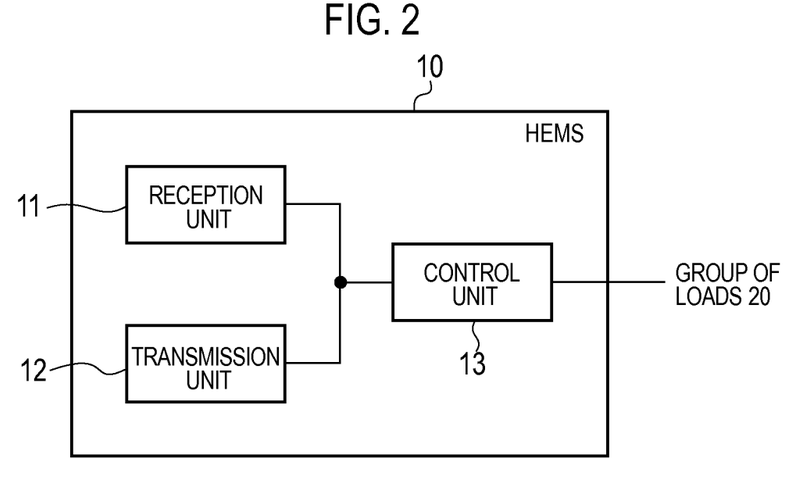
FIG. 2 is a block diagram showing the HEMS 10 according to the first embodiment.

Hereinafter, a lower power management apparatus according to the first embodiment will be described. FIG. 2 is a block diagram showing the HEMS 10 (an example of the lower power management apparatus) according to the first embodiment. As shown in FIG. 2, the HEMS 10 includes a reception unit 11, a transmission unit 12, and a control unit 13.

The reception unit 11 receives various information from the CEMS 40. The reception unit 11 receives power reduction information including the amount of power that should be reduced in each consumer 70, from the CEMS 40. In this case, it should be noted that the power reduction information includes an amount of power to be reduced for each category.

The transmission unit 12 transmits various information to the CEMS 40. The transmission unit 12 transmits, to the CEMS 40, classification result information (power information) including an amount of power consumed for each category to which a load connected to the HEMS 10 (a load included in the group of loads 20) belongs.

In this case, the amount of power consumed included in the classification result information may be the amount of power that can be reduced for each category.

The amount of power that can be reduced for each category may be a numerical value manually input by a user, or a numerical value calculated by the HEMS 10 on the basis of a use history of a load stored in the HEMS 10. Alternatively, when a dispersed power source is provided within the consumer 70, the amount of power that can be reduced for each category may include not only the amount of power reduced by an operation suspension of a load but also the amount of power reduced that is achieved when the power supply from the grid 50 is reduced as a result of the group of loads 20 being supplied with output power from the dispersed power source.

The control unit 13 comprehensively controls the HEMS 10. The control unit 13 controls the group of loads 20 connected to the HEMS 10 by using a signal that complies with a protocol such as ECHONET Lite or ZigBee. In particular, the control unit 13 is capable of controlling the power consumed by the group of loads 20 by controlling an operation mode of the group of loads 20. Specifically, the control unit 13 transmits, to the load included in the group of loads 20, a signal for switching to an operation mode in which it is possible to reduce the power consumed, in response to the power reduction information received from the CEMS 40.

In this case, the control unit 13 grasps a category to which the load included in the group of loads 20 belongs. Further, the control unit 13 grasps power consumed by the load (power currently consumed) included in the group of loads 20.

When the dispersed power source is provided within the consumer 70, the control unit 13 grasps output power from the dispersed power source. Accordingly, when the power consumed by the group of loads 20 is reduced, the control unit 13 may not only stop the operation of the load but also replace at least a part of the power supplied to the group of loads 20 with the output power from the dispersed power source.

(Upper Power Management Apparatus)

Figure 3:
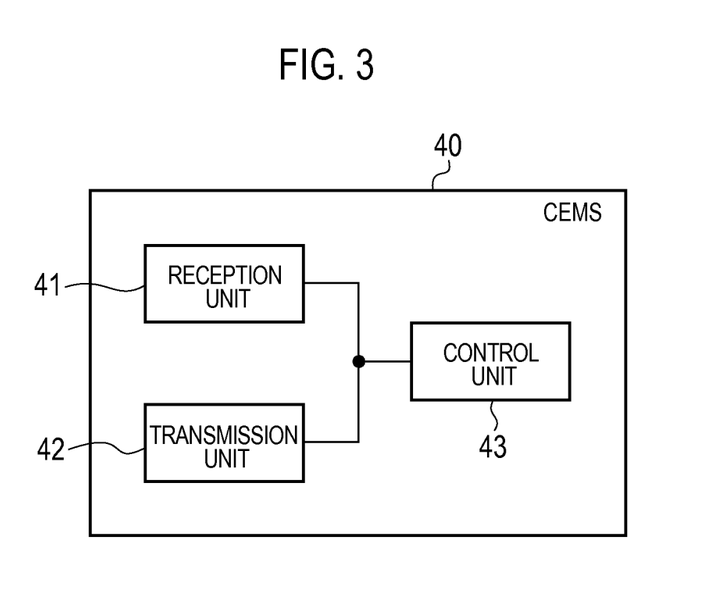
FIG. 3 is a block diagram showing the CEMS 40 according to the first embodiment.

Hereinafter, an upper power management apparatus according to the first embodiment will be described. FIG. 3 is a block diagram showing the CEMS 40 (an example of the upper power management apparatus) according to the first embodiment. As shown in FIG. 3, the CEMS 40 includes a reception unit 41, a transmission unit 42, and a control unit 43.

The reception unit 41 receives various information from the HEMS 10 and the power company 60. Firstly, the reception unit 41 receives, from the power company 60, a power curtailment signal (DR; Demand Response) instructing restraint of an amount of power consumed. It should be noted that an amount to be reduced designated by the power curtailment signal is an amount of power that should be reduced in a whole of the plurality of consumers 70 provided under the CEMS 40.

Secondly, the reception unit 41 receives, from each HEMS 10, the classification result information including the amount of power consumed for each category to which the load connected to the HEMS 10 (the load included in the group of loads 20) belongs.

The transmission unit 42 transmits various information to the HEMS 10. The transmission unit 42 transmits power reduction information including the amount of power that should be reduced in each consumer 70, to the HEMS 10. As described above, it should be noted that the power reduction information includes an amount of power to be reduced for each category.

The control unit 43 integratedly" controls the CEMS 40. Firstly, the control unit 43 determines whether or not the power curtailment designated by the power curtailment signal is achieved in response to the classification result information received from each HEMS 10. In particular, the control unit 43 determines whether or not the power curtailment is achieved by reduction in power consumed by the load in order from the category having a lower priority.

Secondly, the control unit 43 allocates the amount of power that should be reduced in each consumer 70 in accordance with the classification result information including the amount of power consumed for each category.

For example, an amount of power to be reduced R (i) that should be reduced in a consumer (i), or HEMS (i), is calculated according to the following procedure, for example. In this case, as a category to which a load belongs, a case where the categories A to C exist is provided as an example.

Firstly, in a case where the power curtailment is achieved by reduction in power consumed by the load belonging to the category C, the amount of power to be reduced R (i) is calculated by the following Equation (1).

$$R(i)=P_C(i) \times c(i) \times PDR/P_C SUM \quad \text{Equation (1), wherein}$$

$\Sigma P_C(i) \times c(i) = P_C SUM$, and $PDR \leq P_C SUM$

In this case, $P_C(i)$ denotes an amount of power that can be reduced (amount of power included in the classification result information) for a load belonging to the category C at the consumer (i). PDR denotes an amount of power to be reduced designated by the power curtailment signal, and specifically, denotes an amount of power that should be reduced in a whole of the plurality of consumers 70 provided under the CEMS 40. $P_C SUM$ is a sum of the amount of power that can be reduced for the load belonging to the category C, in a whole of the plurality of consumers 70 provided under the CEMS 40.

c(i) is a coefficient corresponding to a contract of a maximum current value available for the consumer (i). Preferably, the greater the contracted maximum current value is, the greater a value of c(i) is. It is noted that c(i) may be a constant value (for example, "1").

Secondly, in a case where the power curtailment is achieved by reduction in power consumed by the load belonging to the category C and the category B, the amount of power to be reduced R(i) is calculated by the following Equation (2).

$$R(i)=P_C(i)+P_B(i) \times b(i) \times (PDR-P_C SUM)/P_B SUM \quad \text{Equation (2), wherein}$$

$\Sigma P_B(i) \times b(i) = P_B SUM$, and $PDR \leq P_C SUM + P_B SUM$

In this case, $P_B(i)$ denotes an amount of power that can be reduced (amount of power included in the classification result information) for a load belonging to the category B at the consumer (i). $P_B SUM$ is a sum of the amount of power that can be reduced for the load belonging to the category B, in a whole of the plurality of consumers 70 provided under the CEMS 40.

b(i) is a coefficient corresponding to a contract of a maximum current value available for the consumer (i). Preferably, the greater the contracted maximum current value is, the greater a value of b(i) is. It is noted that b(i) may be a constant value (for example, "1"). Further, b(i) may be the same in value as c(i), or may be different in value from c(i).

Thirdly, in a case where the power curtailment is not achieved by reduction in power consumed by the load belonging to the category C and the category B, the amount of power to be reduced R(i) is calculated by the following Equation (3).

$$R(i)=P_C(i)+P_B(i)+P_A(i) \times a(i) \times (PDR-P_C SUM-P_B SUM)/P_A SUM \quad \text{Equation (3), wherein}$$

$\Sigma P_A(i) \times a(i) = P_A SUM$, and $P_C SUM + P_B SUM + P_A SUM < PDR$

In this case, $P_A(i)$ denotes an amount of power that can be reduced (amount of power included in the classification result information) for a load belonging to the category A at the consumer (i). $P_A SUM$ is a sum of the amount of power that can be reduced for the load belonging to the category A, in a whole of the plurality of consumers 70 provided under the CEMS 40.

a(i) is a coefficient corresponding to a contract of a maximum current value available for the consumer (i). Preferably, the greater the contracted maximum current value is, the greater a value of a(i) is. It is noted that a(i) may be a constant value (for example, "1"). Further, a(i) may be the same in value as c(i) or b(i), or may be different in value from c(i) or b(i).

(Power Management Method)

Figure 4:
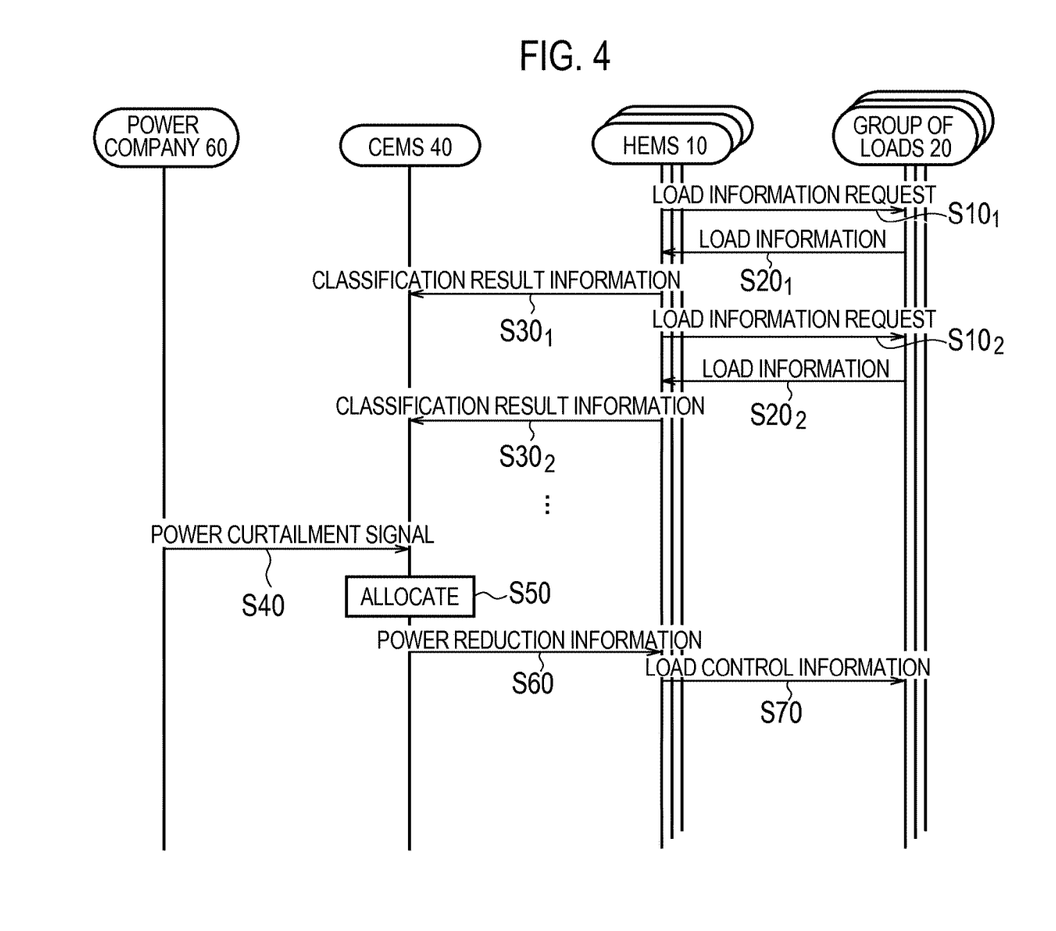
FIG. 4 is a sequence diagram showing a power management method according to the first embodiment.

Hereinafter, a power management method according to the first embodiment will be described. FIG. 4 is a sequence diagram showing an operation of the CEMS 40 according to the first embodiment.

As shown in FIG. 4, in step $10_1$, each HEMS 10 transmits, to each group of loads 20, a load information request for requesting power consumed by a load (power currently consumed) included in the group of loads 20.

In step $20_1$, each HEMS 10 receives, from the group of loads 20, the load information including the power consumed by the load included in the group of loads 20 (the power currently consumed). In this case, it should be noted that the load information includes the amount of power consumed for each category.

In step $30_1$, the CEMS 40 receives, from each HEMS 10, the classification result information including the amount of power consumed for each category to which the load connected to the HEMS 10 (the load included in the group of loads 20) belongs.

In this case, it is noted that processes of step $10_2$ to step $30_2$ are similar to the processes of step $10_1$ to step $30_1$. That is, the CEMS 40 periodically receives the classification result information from each HEMS 10.

In step 40, the CEMS 40 receives, from the power company 60, the power curtailment signal (DR; Demand Response) instructing restraint of the amount of power consumed.

In step 50, the CEMS 40 allocates the amount of power that should be reduced by each consumer 70 in accordance with the classification result information including the amount of power consumed for each category.

For example, in a case where the power curtailment is achieved by reduction in the power consumed by the load belonging to the category C (that is, in a case where $PDR \leq P_C SUM$ is satisfied), the amount of power to be reduced R(i) is calculated by the following Equation (1).

$$R(i)=P_C(i) \times c(i) \times PDR/P_C SUM \quad \text{Equation (1), wherein}$$

$\Sigma P_C(i) \times c(i) = P_C SUM$ in a case where the power curtailment is achieved by reduction in the power consumed by the load belonging to the category C and the category B (that is, in a case where PDR $P_C$SUM+$P_B$SUM is satisfied), the amount of power to be reduced R(i) is calculated by the following Equation (2).

$$R(i)=P_C(i)+P_B(i)\times b(i)\times(PDR-P_C\text{SUM})/P_B\text{SUM} \quad \text{Equation (2), wherein}$$

$$\Sigma P_B(i)\times b(i)=P_B\text{SUM}$$

in a case where the power curtailment is not achieved by reduction in the power consumed by the load belonging to the category C and the category B (that is, in a case where $P_C$SUM+$P_B$SUM<PDR is satisfied), the amount of power to be reduced R(i) is calculated by the following Equation (3).

$$R(i)=P_C(i)+P_B(i)+P_A(i)\times a(i)\times(PDR-P_C\text{SUM}-P_B\text{SUM})/P_A\text{SUM} \quad \text{Equation (3), wherein}$$

$$\Sigma P_A(i)\times a(i)=P_A\text{SUM}$$

In step 60, the CEMS 40 transmits, to each HEMS 10, power reduction information including an amount of power that should be reduced in each consumer 70. It should be noted that the power reduction information includes the amount of power to be reduced for each category.

In step 70, each HEMS 10 reduces the power consumed by the load included in the group of loads 20 in response to power reduction information received from the CEMS 40.

In the first embodiment, the CEMS 40 that manages the plurality of HEMSs 10 transmits, to each HEMS 10, the power reduction information in response to the classification result information received for each category having a priority.

An amount of power that can be reduced is different for each consumer. Further, some consumers usually try to save power, and other consumers do not usually try to save power. Thus, when reduction in power consumed is required uniformly to consumers, a sense of unfairness arises among consumers. Thus, the CEMS 40 that manages the plurality of HEMSs 10 allocates the amount of power to be reduced in each consumer 7 in consideration of an amount of power that can be reduced for each consumer 70, and it is thus possible to alleviate a sense of unfairness among the respective consumers.

On the other hand, the power company 60 does not need to consider the amount of power that can be reduced for each consumer 70, and may just designate, to the CEMS 40, an amount of power that should be reduced in a whole of the consumers 70. That is, the power company 60 does not need power usage information of each consumer 70, and thus, the power company 60 does not need to bear a burden required for managing the power usage information of each consumer 70, either. It is not necessary for the consumer 70 to provide the power company 60 with power usage information of the consumer 70, either, which is preferable in view of privacy protection.

If it is difficult to achieve a target amount to be reduced (for example, 10%), then the power company 60 may transmit a power curtailment signal indicating a larger amount to be reduced (for example, 15%) to reduce total power currently consumed by the target amount to be reduced in a whole of the plurality of consumers 70. However, by allocating the amount of power to be reduced, that is, an amount that can be reduced for each consumer 70, the CEMS 40 is capable of highly certainly achieving the target amount to be reduced. Thus, the CEMS 40 allocates the amount of power to be reduced which is the amount that can be reduced for each consumer 70, and it is thus possible for the power company 60 to achieve the target amount to be reduced with high certainty. Thus, the power company 60 does not also need to increase the amount to be reduced designated by the power curtailment signal to be larger than the target amount to be reduced.

As described above, according to the power management system 100 of the embodiment, it is possible to appropriately restrain the amount of power consumed by a load provided in each consumer.

Further, the power reduction information is transmitted in response to the classification result information including the amount of power consumed for each category having a priority, and thus, power consumed by a load belonging to a category having a lower priority is reduced first in an orderly manner, as a result of which reduction in power that should be supplied to a load belonging to a category having a higher priority, that is, a load necessary for a daily life, is restrained.

Other Embodiments

The present invention has been described according to the aforementioned embodiment. It must not be understood that, however, the discussions and the drawings constituting a part of this disclosure limit the present invention. From this disclosure, various alternative embodiments, examples and operational techniques will be apparent to those skilled in the art.

In the embodiment, the HEMS 10 is employed as an example of the lower power management apparatus and the CEMS 40 is employed as an example of the upper power management apparatus; however, the embodiment is not limited thereto. The upper power management apparatus may suffice to manage a plurality of lower power management apparatuses. In other words, it suffices that the lower power management apparatus is managed by the upper power management apparatus. Further, the lower power management apparatus may be a BEMS (Building and Energy Management System) or a FEMS (Factory Energy Management System), for example.

In the embodiment, the CEMS 40 periodically receives, from each consumer 70, the classification result information including the amount of power consumed for each category. However, the embodiment is not limited thereto. For example, the CEMS 40 may request each consumer 70 to transmit the classification result information in response to the power curtailment signal (DR; Demand Response).

Note that the entire content of the Japanese Patent Application No. 2011-209955 (filed on Sep. 26, 2011) is incorporated herein by reference.

INDUSTRIAL APPLICABILITY

The present invention can provide a power management system, a power management method, and an upper power management apparatus with which it is possible to appropriately restrain an amount of power consumed by a load provided in each consumer.

The invention claimed is:
1. A power management system comprising
a plurality of lower power management apparatuses, wherein each of the plurality of lower power management apparatuses is associated with one of a plurality of consumers and comprises a processor; and
an upper power management apparatus that manages the plurality of lower power management apparatuses and comprises a processor,
wherein the processor of each lower power management apparatus transmits power information to the upper power management apparatus, the power information including an amount of power consumed by loads connected to each lower power management apparatus, wherein each load is associated with one of a plurality of categories, wherein the processor of the upper power management apparatus, in response to a power curtailment signal and the power information, transmits reduction information to each lower power management apparatus, the reduction information including an amount of power that should be reduced in each consumer, and the power curtailment signal being transmitted from a power company that manages a power grid and including an amount of power to be curtailed, wherein the processor of the upper power management apparatus decides the amount of power that should be reduced, in accordance with a coefficient corresponding to a maximum current value, the maximum current value being determined based on a contract with the consumer and being a maximum value of current available under the consumer's contract, and wherein the processor of each lower power management apparatus, in response to the reduction information received from the upper management apparatus, reduces power consumed by at least one load connected to the lower power management apparatus.

2. The power management system according to claim 1, wherein each of the plurality of categories has one of a plurality of priorities, and the upper power management apparatus decides the amount of power that should be reduced in each consumer so as to preferentially reduce power consumed by a load belonging to a category having a low priority.

3. The power management system according to claim 2, wherein the processor of each lower power management apparatus reduces power consumed by the loads connected to each lower power management apparatus, in response to the reduction information received from the upper power management apparatus.

4. The power management system according to claim 1, wherein the processor of each lower power management apparatus periodically transmits the power information to the upper power management apparatus.

5. A power management method applied to a power management system comprising a plurality of lower power management apparatuses, wherein each of the plurality of lower power management apparatuses is associated with one of a plurality of consumers, and an upper power management apparatus that manages the plurality of lower power management apparatuses, comprising:

transmitting power information from each lower power management apparatus to the upper power management apparatus, the power information including an amount of power consumed by loads connected to each lower power management apparatus, wherein each load is associated with one of a plurality of categories;

transmitting reduction information from the upper power management apparatus to each lower power management apparatus in response to a power curtailment signal and the power information, the reduction information including an amount of power that should be reduced in each consumer, and the power curtailment signal being transmitted from a power company that manages a power grid and including an amount of power to be curtailed;

deciding the amount of power that should be reduced in accordance with a coefficient corresponding to a maximum current value, the maximum current value being determined based on a contract with the consumer and being a maximum value of current available under the consumer's contract; and, by each lower power management apparatus, in response to the reduction information received from the upper management apparatus, reducing power consumed by at least one load connected to the lower power management apparatus.

6. The power management method according to claim 5, comprising:

reducing, in each lower power management apparatus, power consumed by loads connected to each lower power management apparatus, in response to reduction information received from the upper power management apparatus.

7. An upper power management apparatus that manages a plurality of lower power management apparatuses, wherein each of the plurality of lower power management apparatuses is associated with one of a plurality of consumers, comprising:

a receiver configured to receive power information from each lower power management apparatus, the power information including an amount of power consumed by loads connected to each lower power management apparatus, wherein each load is associated with one of a plurality of categories; and a transmitter configured to transmit reduction information to each lower power management apparatus, in response to a power curtailment signal and the power information, the reduction information including the amount of power that should be reduced in each consumer, and the power curtailment signal being transmitted from a power company that manages a power grid and including an amount of power to be curtailed; and a processor configured to decide the amount of power that should be reduced in accordance with a coefficient corresponding to a maximum current value, the maximum current value being determined based on a contract with the consumer and being a maximum value of current available under the consumer's contract, wherein the reduction information is used for reducing power consumed by at least one load connected to the lower power management apparatus by each lower power management apparatus.

8. A power management system comprising:

a plurality of lower power management apparatuses, wherein each of the plurality of lower power management apparatuses is associated with one of a plurality of consumers and comprises a processor; and an upper power management apparatus that manages the plurality of lower power management apparatuses and comprises a processor, wherein the processor of each lower power management apparatus transmits, to the upper power management apparatus, power information including an amount of power consumed by loads connected to each lower power management apparatus, wherein each load is associated with one of a plurality of prioritized categories, wherein the processor of the upper power management apparatus, in response to a power curtailment signal that includes an amount of power to be curtailed, for each lower power management apparatus, calculates an amount of power that should be reduced by that lower power management apparatus based on a formula $$R = P_R \times c \times \frac{(PDR - P_L\text{SUM})}{P_H\text{SUM}}$$

wherein R represents the amount of power that should be reduced, PR represents an amount of power consumed by loads connected to the lower power management apparatus that are associated with prioritized categories of lower priority than a highest priority category needed to satisfy the amount of power to be curtailed, c represents a coefficient corresponding to a contract of a maximum value of current available to the consumer associated with the lower power management apparatus, PDR represents the amount of power to be curtailed, $P_L$SUM represents an amount of power consumed by all loads within the categories of lower priority than the highest priority category needed to satisfy the amount of power to be curtailed, and $P_H$SUM represents an amount of power consumed by loads within the highest priority category needed to satisfy the amount of power to be curtailed, and transmits reduction information, including the calculated amount of power that should be reduced, to that lower power management apparatus, and wherein the processor of each lower power management apparatus, in response to the reduction information received from the upper management apparatus, reduces power consumed by at least one load connected to the lower power management apparatus.

9. A power management method applied to a power management system comprising a plurality of lower power management apparatuses each of which is associated with one of a plurality of consumers, and an upper power management apparatus that manages the plurality of lower power management apparatuses, the method comprising:

transmitting, from each lower power management apparatus to the upper power management apparatus, power information including an amount of power consumed by loads connected to each lower power management apparatus, wherein each load is associated with one of a plurality of prioritized categories;

in response to a power curtailment signal that includes an amount of power to be curtailed, by the upper management apparatus, for each lower power management apparatus, calculating an amount of power that should be reduced by that lower power management apparatus based on a formula $$R = P_R \times c \times \frac{(PDR - P_L\text{SUM})}{P_H\text{SUM}}$$

wherein R represents the amount of power that should be reduced, PR represents an amount of power consumed by loads connected to the lower power management apparatus that are associated with prioritized categories of lower priority than a highest priority category needed to satisfy the amount of power to be curtailed, c represents a coefficient corresponding to a contract of a maximum value of current available to the consumer associated with the lower power management apparatus, PDR represents the amount of power to be curtailed, $P_L$SUM represents an amount of power consumed by all loads within the categories of lower priority than the highest priority category needed to satisfy the amount of power to be curtailed, and $P_H$SUM represents an amount of power consumed by loads within the highest priority category needed to satisfy the amount of power to be curtailed, and transmitting, to that lower power management apparatus, reduction information, including the calculated amount of power that should be reduced; and by each lower power management apparatus, in response to the reduction information received from the upper management apparatus, reducing power consumed by at least one load connected to the lower power management apparatus.

10. An upper power management apparatus comprising a processor that:

receives, from each of a plurality of lower power management apparatuses, power information including an amount of power consumed by loads connected to that lower power management apparatus, wherein each load is associated with one of a plurality of prioritized categories; and, in response to a power curtailment signal that includes an amount of power to be curtailed, for each of the plurality of lower power management apparatuses, calculates an amount of power that should be reduced by that lower power management apparatus based on a formula $$R = P_R \times c \times \frac{(PDR - P_L\text{SUM})}{P_H\text{SUM}}$$

wherein R represents the amount of power that should be reduced, PR represents an amount of power consumed by loads connected to the lower power management apparatus that are associated with prioritized categories of lower priority than a highest priority category needed to satisfy the amount of power to be curtailed, c represents a coefficient corresponding to a contract of a maximum value of current available to the consumer associated with the lower power management apparatus, PDR represents the amount of power to be curtailed, $P_L$SUM represents an amount of power consumed by all loads within the categories of lower priority than the highest priority category needed to satisfy the amount of power to be curtailed, and $P_H$SUM represents an amount of power consumed by loads within the highest priority category needed to satisfy the amount of power to be curtailed, and transmits reduction information, including the calculated amount of power that should be reduced, to that lower power management apparatus, wherein a processor of each lower power management apparatus, in response to the reduction information received from the upper management apparatus, reduces power consumed by at least one load connected to the lower power management apparatus.

* * * * *